(12) United States Patent
Dragone et al.

(10) Patent No.: US 11,191,154 B2
(45) Date of Patent: Nov. 30, 2021

(54) ENCLOSURE WITH TAMPER RESPONDENT SENSOR

(71) Applicant: International Business Machines Corporation, Armonk, NY (US)

(72) Inventors: Silvio Dragone, Olten (CH); Stefano S. Oggioni, Besana in Brianza (IT); William Santiago Fernandez, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 16/007,385

(22) Filed: Jun. 13, 2018

(65) Prior Publication Data
US 2019/0387617 A1 Dec. 19, 2019

(51) Int. Cl.
*H04L 29/06* (2006.01)
*H05K 1/02* (2006.01)
(Continued)

(52) U.S. Cl.
CPC ............ *H05K 1/0275* (2013.01); *G01B 7/16* (2013.01); *G06F 21/60* (2013.01); *H05K 1/0203* (2013.01);
(Continued)

(58) Field of Classification Search
CPC .. G06F 21/87; G06F 21/60; G06F 2221/2143; H04K 1/0275; H04K 3/4664;
(Continued)

(56) References Cited

U.S. PATENT DOCUMENTS 7,760,086 B2    7/2010    Hunter et al.
9,521,764 B2    12/2016    Steiner
(Continued)

FOREIGN PATENT DOCUMENTS

WO    2014158159 A1    10/2014

OTHER PUBLICATIONS

Joe Grand, "Practical Secure Hardware Design for Embedded Systems (Part 1 of 2)", Retrieved From https://www.informit.com/articles/printerfriendly/328170, Published Aug. 6, 2004 (Year: 2004).*

(Continued)

*Primary Examiner* — Chau Le
(74) *Attorney, Agent, or Firm* — Cantor Colburn LLP; Daniel Morris (57) ABSTRACT

A method to fabricate a tamper respondent assembly is provided. The tamper respondent assembly includes an electronic component and an enclosure at least partly enclosing the electronic component. A piezoelectric sensor is integrated in the enclosure. The integrating includes providing a base structure that includes a first conductive layer, depositing a piezoelectric layer on the first conductive layer, covering the piezoelectric layer with a second conductive layer, and providing sensing circuitry for observing sensing signals of the piezoelectric layer. The piezoelectric layer includes a plurality of nanorods. Aspects of the invention further relates to a corresponding assembly and a corresponding computer program product.

25 Claims, 7 Drawing Sheets

(51) Int. Cl.
*H05K 1/18* (2006.01)
*H05K 3/46* (2006.01)
*G06F 21/60* (2013.01)
*G01B 7/16* (2006.01)

(52) U.S. Cl.
CPC ........... *H05K 1/181* (2013.01); *H05K 3/4664* (2013.01); *G06F 2221/2143* (2013.01); *H05K 2201/0141* (2013.01); *H05K 2201/10083* (2013.01); *H05K 2201/10151* (2013.01); *H05K 2201/10371* (2013.01); *H05K 2203/0736* (2013.01); *H05K 2203/107* (2013.01)

(58) Field of Classification Search
CPC ....... H04K 2201/043; H05K 2203/107; H05K 2203/0736; H05K 2201/10371; H05K 2201/10151; H05K 2201/10083; H05K 2201/0141; H05K 3/4664; H05K 1/181; H05K 1/0275; H05K 1/0203; G01B 7/16
See application file for complete search history.

(56) References Cited

U.S. PATENT DOCUMENTS

| | | | |
|---|---|---|---|
| 9,591,776 B1 | 3/2017 | Brodsky et al. | |
| 9,717,154 B2 | 7/2017 | Brodsky et al. | |
| 10,271,424 B2 | 4/2019 | Dragone et al. | |
| 2007/0221117 A1* | 9/2007 | Fleischman | G08B 13/126 116/67 R |
| 2007/0269159 A1* | 11/2007 | Dangler | G02B 6/3608 385/14 |
| 2008/0061969 A1* | 3/2008 | Okude | G08B 13/10 340/541 |
| 2012/0117666 A1 | 5/2012 | Oggioni et al. | |
| 2013/0104252 A1 | 4/2013 | Yanamadala et al. | |
| 2013/0283386 A1* | 10/2013 | Lee | G06F 21/86 726/26 |
| 2014/0325688 A1 | 10/2014 | Cashin et al. | |
| 2015/0182741 A1* | 7/2015 | Baik | A61L 15/26 607/152 |
| 2017/0089729 A1 | 3/2017 | Brodsky et al. | |
| 2017/0094808 A1* | 3/2017 | Brodsky | G01D 5/16 |
| 2017/0094847 A1 | 3/2017 | Fisher et al. | |
| 2019/0311157 A1 | 10/2019 | Immler et al. | |

OTHER PUBLICATIONS

Dragone et al., "Enclosure With Mulit-Tamper Respondent Sensor," U.S. Appl. No. 16/007,408, filed Jun. 13, 2018.

List of IBM Patents or Patent Applications Treated as Related; Date Filed: Jun. 13, 2018, 2 pages.

Paley et al., "Active Protection against PCB Physical Tampering," 2016 17th International Symposium on Quality Electronic Design (ISQED), IEEE, 2016, pp. 356-361.

Ferres et al.,"Capacitive Mulit-Channel Security Sensor IC for Tamper-Resistant Enclosures." 2018 IEEE Sensors, New Delhi, 2018, pp. 1-4.

Ford, "Piezo Device Harvests Energy From Sound," URL: https://www.theengineer.co.uk/piezo-device-harvests-energy-from-sound/; Retrieved: Sep. 21, 2020; Published: Sep. 1, 2014; 5 Pages.

Eren et al., "Fringe-Effect Capacitive Proximity Sensors for Tamper Proof Enclosures," 2005 Sensors for Industry Conference, Houston, TX, 2005, pp. 22-26.

* cited by examiner

ENCLOSURE WITH TAMPER RESPONDENT SENSOR

BACKGROUND

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin. A security sensor may be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

It is therefore desirable to provide improved tamper respondent assemblies and corresponding fabrication methods.

SUMMARY

According to an embodiment of a first aspect of the invention, a method to fabricate a tamper respondent assembly is provided. The tamper respondent assembly comprises an electronic component and an enclosure at least partly enclosing the electronic component. The method comprising integrating a piezoelectric sensor in the enclosure. The integrating comprises steps of providing a base structure comprising a first conductive layer, depositing a piezoelectric layer on the first conductive layer, covering the piezoelectric layer with a second conductive layer and providing sensing circuitry for observing sensing signals of the piezoelectric layer. The piezoelectric layer comprises a plurality of nanorods.

Such a method allows the integration of a piezoelectric device into a tamper respondent assembly in an efficient, flexible and reliable way. Furthermore, embodiments of the invention facilitate a large sensing area compared e.g. with the sensing area of discrete piezoelectric sensors. The integrated piezoelectric device according to embodiments of the invention enhances the security of the tamper respondent assembly.

According to an embodiment, the depositing of the piezoelectric layer comprises steps of spraying a plurality of nanoparticles onto the first structure and growing the plurality of nanorods on the first structure.

Such a spraying further facilitates an integration of the piezoelectric device into the tamper respondent assembly in a smart, reliable and cost-efficient way.

According to an embodiment, growing the plurality of nanorods comprises a chemical growth process. Such a chemical growth process further facilitates an integration of the piezoelectric device into the tamper respondent assembly in a smart, reliable and cost-efficient way.

According to an embodiment, the chemical growth process is a low temperature growth process performed at a temperature below about 150° C. This facilitates ease of manufacturing.

According to an embodiment, the chemical growth process involves placing the first structure with the nanoparticles in a solution comprising hexamethylenetetramine (HMT). This facilitates an efficient growth process and is in addition a cost-efficient method. In embodiments of the invention, a temperature range for such a process is between 80° C. and 100° C.

According to an embodiment, additional elements/atoms of the material of the nanoparticles might be placed into the solution to enlarge the growth resources. As an example, the solution may comprise a mixture of zinc nitrate and HMT.

According to an embodiment, the chemical growth process may be accelerated by adding additives to the solution, in particular poly(ethylenimene) (PEI), ammonium hydroxide or ammonium chloride. This may produce the nanorods more rapidly.

According to an embodiment, the chemical growth process involves a controlled hydrolysis of the nanoparticle precursor, e.g. the Zn precursor, and a controlled supply of hydroxide ions to maintain a nanoparticle to [OH] ratio, e.g. a zinc to [OH] ratio that will lead to nanorod formation.

According to an embodiment, the nanoparticles are selected from the group consisting of: zinc oxide (ZnO), lead zirconate titanate (PZT) and barium titanate (BTO). These materials have been identified as particularly suitable for methods embodying the invention.

According to an embodiment, the plurality of nanoparticles are electrostatically pre-loaded to facilitate an adhesion of the nanoparticles on the first conductive layer. According to an embodiment, the first conductive layer is coupled to a predefined electrostatic potential to facilitate an adhesion of the nanoparticles on the first conductive layer.

With such embodiments, the deposition of the piezoelectric layer can be supported by electrostatic forces.

According to an embodiment, spraying the nanoparticles comprises spraying a solution comprising the nanoparticles and a solvent. This is a particularly efficient method to apply the nanoparticles on the first conductive layer. The solvent may facilitate a smooth and uniform application of the nanoparticles on the first conductive layer and may be subsequently removed, e.g. by heating.

According to an embodiment, the nanorods have an aspect ratio between about 2 and about 50.

According to an embodiment, the first conductive layer comprises a conductive mesh. Such a mesh-structure of the conductive mesh may support adhesive forces between the base structure and the first conductive layer.

According to an embodiment, the second conductive layer comprises also a conductive mesh.

According to another embodiment, the second conductive layer comprises a conductive foil. This allows for further application techniques such as gluing.

According to an embodiment, providing the base structure comprises printing the base structure by a 3-dimensional printing process. Furthermore, covering the piezoelectric layer with the second conductive layer comprises printing the second conductive layer by a 3-dimensional printing process. This is a very flexible and efficient fabrication method.

According to an embodiment, providing the base structure comprises forming the base structure by laser direct structuring. Furthermore, covering the piezoelectric layer with a second conductive layer comprises attaching a metal foil on the piezoelectric layer. This is another flexible and efficient fabrication method. The metal foil may be e.g. attached to the piezoelectric layer by gluing.

According to an embodiment, providing the base structure comprises forming the base structure by liquid crystal polymer molding. This is another efficient fabrication method According to an embodiment of another aspect of the invention, a tamper respondent assembly is provided. The tamper respondent assembly comprises an electronic component, an enclosure enclosing at least partly the electronic component and a piezoelectric sensor integrated in the enclosure. The piezoelectric sensor comprises a base structure comprising a first conductive layer, a second conductive layer and a piezoelectric layer arranged between the first conductive layer and the second conductive layer. The piezoelectric layer comprises a plurality of nanorods. In addition, the tamper respondent assembly comprises sensing circuitry configured to observe sensing signals of the integrated piezoelectric sensor. The sensing circuitry allows the detection of physical tampering events of the enclosure.

Embodiments of the tamper respondent assembly may safeguard security sensitive data and circuitry that could be otherwise compromised by reverse engineering and other exploitation efforts. The integrated piezoelectric sensor may continuously monitor to thwart drilling efforts. The electronic component, e.g. microchip, and its stored data may be protected from undesired analysis by the piezoelectric sensor.

According to an embodiment, the sensing circuitry is configured with a plurality of strain profiles, the plurality of strain profiles comprising a first set of strain profiles associated to non-tampering events and a second set of strain profiles associated to tampering events. This may improve a reliable functioning of the piezoelectric sensor and it may in particular reduce false alarms.

According to an embodiment, at least the first conductive layer comprises a mesh structure.

According to an embodiment, the enclosure comprises an outer mesh structure comprising a third conductive layer and a fourth conductive layer. Furthermore, the tamper respondent assembly comprises sensing circuitry configured to observe conductance changes of the outer mesh structure. The piezoelectric sensor is arranged between the third conductive layer and the fourth conductive layer.

According to an embodiment, the tamper respondent assembly further comprises a printed circuit board and a cover arranged on the printed circuit board. The electronic component is arranged on the printed circuit board and the cover and the printed circuit board form the enclosure. Furthermore, the piezoelectric sensor is integrated in the printed circuit board.

According to an embodiment, a tamper respondent assembly comprises a printed circuit board and a cover arranged on the printed circuit board. The electronic component is arranged on the printed circuit board and the cover and the printed circuit board form the enclosure. Furthermore, the piezoelectric sensor is integrated in the cover.

According to an embodiment of another aspect of the invention, a security system for protecting security-sensitive information is provided. The security system comprises an electronic component configured to store and/or process security sensitive information and a piezoelectric sensor. The piezoelectric sensor comprises a base structure comprising a first conductive layer, a second conductive layer and a piezoelectric layer arranged between the first conductive layer and the second conductive layer. The piezoelectric layer comprises a plurality of nanorods. Furthermore, the security system comprises sensing circuitry configured to observe sensing signals of the piezoelectric sensor and to provide an alarm signal to the electronic component upon detection of predefined strain profiles. Furthermore, the electronic component is configured to initiate an action to obstruct analysis of the security-sensitive information upon receipt of the alarm signal. According to embodiments, the security sensitive information may be e.g. erased upon detection of a tampering event and receipt of a corresponding alarm signal.

According to an embodiment of another aspect, a computer program product for observing sensing signals of sensing circuitry of a security system for protecting security-sensitive information is provided. The security system comprises an electronic component configured to store and/or process security sensitive information, a piezoelectric sensor comprising a piezoelectric layer comprising a plurality of nanorods and sensing circuitry for observing sensing signals of the piezoelectric sensor. The computer program product comprises a computer readable storage medium having program instructions embodied therewith, the program instructions executable by the security system to cause the security system to perform a method. The method comprises steps of observing sensing signals of the piezoelectric sensor, providing an alarm signal upon detection of predefined strain profiles and initiating an action to obstruct analysis of the security-sensitive information upon receipt of the alarm signal.

Advantages of the features of one aspect of the invention may apply to corresponding features of another aspect of the invention.

Devices and methods embodying the present invention will now be described, by way of non-limiting examples, and in reference to the accompanying drawings. Technical features depicted in the drawings are not necessarily to scale. Also some parts may be depicted as being not in contact to ease the understanding of the drawings, whereas they may very well be meant to be in contact, in operation.

DETAILED DESCRIPTION

Figure 1A:
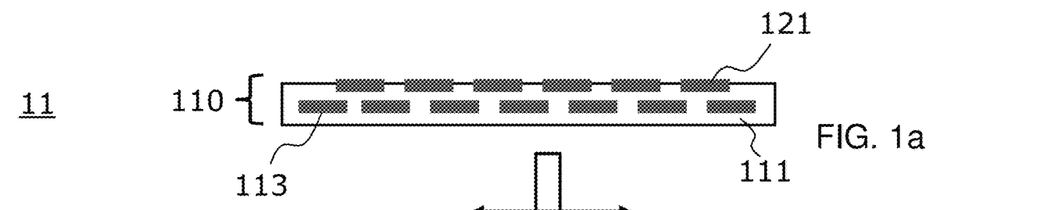
FIGS. 1a, 1b, 1c, 1d and 1e illustrate method steps of a method for fabricating a tamper respondent assembly according to an embodiment of the invention.

FIGS. 1a, 1b, 1c, 1d and 1e illustrate in a schematic and simplified way method steps of a method for fabricating a tamper respondent assembly according to an embodiment of the invention. The tamper respondent assembly comprises an electronic component and an enclosure enclosing the electronic component. According to the embodied method, a piezoelectric sensor is integrated in at least a part of the enclosure. Such an integration comprises steps as follows:

At a step 11, a base structure 110 is provided. The base structure 110 comprises a first conductive layer 121 and a third conductive layer 113. The base structure 110 may be embodied as printed circuit board. The base structure 110 may comprise an electrically insulating material 111, in particular a polymer 111, as base material, in particular a composite material such as fiber-reinforced plastic (FRP).

The first conductive layer 121 and the third conductive layer 113 are embodied as conductive meshes. Each of the conductive meshes comprises an electrically conductive material, in particular a metal such as copper.

The base structure 110 may be in particular formed by a 3-dimensional printing process. Accordingly, the 3-dimensional printing process starts by printing several layers of the insulating material 111. Then it continues by printing the third conductive layer 113, by printing again layers of the insulating material 111 and on top of it printing the first conductive layer 121.

According to other embodiments, the base structure may be fabricated with other methods as will be described later in more detail.

Figure 1B:
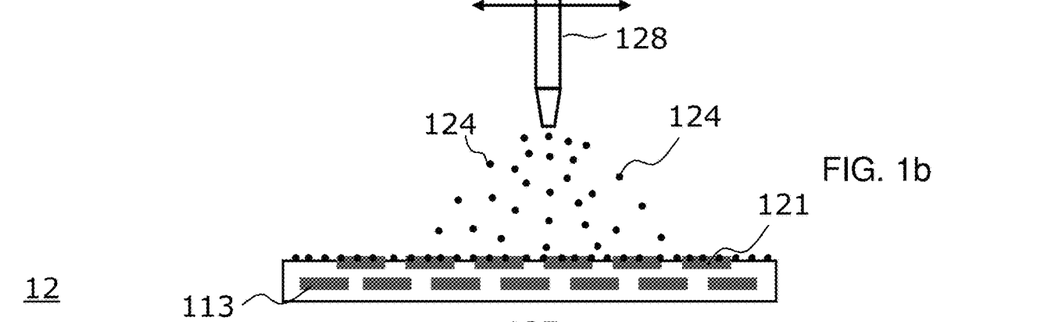
Figure 1C:
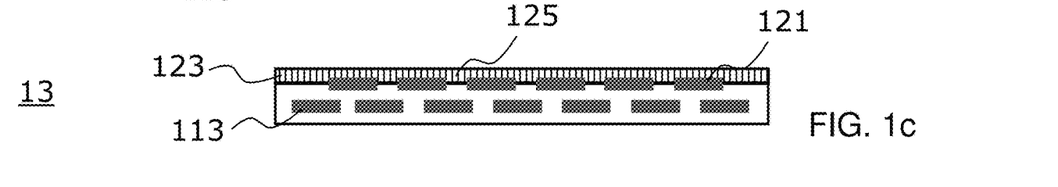

At steps 12 and 13, a piezoelectric layer 123 is deposited on the first conductive layer 121.

The depositing of the piezoelectric layer 123 comprises as step 12 a spraying of a plurality of nanoparticles 124 onto the base structure 110. As a result, the plurality of nanoparticles 124 assemble on the surface of the base structure 110, in particular on the first conductive layer 121. The nanoparticles 124 may be in particular ZnO-nanoparticles. The nanoparticles 124 may be in particular solubilized in a solvent such as water, or Ethanol, or butyl acetate.

Hence, according to embodiments the step 12 may comprise spraying a solution comprising the nanoparticles 124 and a solvent, e.g. by means of a spray gun 128.

The depositing of the piezoelectric layer 123 comprises as step 13 a growing of a plurality of nanorods 125 from the plurality of nanoparticles 124 on the base structure 110. As a result, the piezoelectric layer 123 comprises a plurality of nanorods 125. The plurality of nanorods 125 may be grown in particular by a chemical growth process. The chemical growth process may be in particular a low temperature growth process performed at a temperature below 150° C. In embodiments of the invention, the nanorods 125 have an aspect ratio between about 2 and about 50.

According to embodiments, the chemical growth process performed at step 13 involves placing the first structure 110 with the nanoparticles 124 in a solution comprising hexamethylenetetramine. The growth process may be performed in particular at a temperature range between 80° C. and 100° C.

At the end of step 13, a complete piezoelectric layer 123 comprising a plurality of nanorods 125 has been grown on the first conductive layer 121.

Figure 1D:
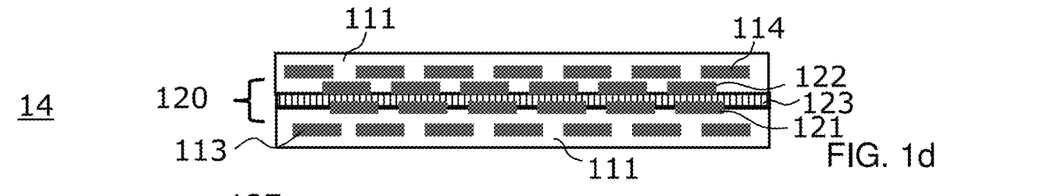

Then at a step 14, a second conductive layer 122 is deposited on the piezoelectric layer 123. This step may be again performed e.g. by a 3D-printing process. Next, several layers of the insulating base material 111 may be deposited on the second conductive layer 122. Then, a fourth conductive layer 114 may be deposited. The intermediate insulating base material 111 and the fourth conductive layer 114 may be applied also by a 3-dimensional printing process.

The first conductive layer 121, the second conductive layer 122 and the piezoelectric layer 123 establish a piezoelectric sensor 120, which may also be denoted as piezoelectric device 120. More particularly, the first conductive layer 121 and the second conductive layer 122 may serve as electrodes of the piezoelectric device and the piezoelectric layer 123 as the sensing element that provides an electrical voltage between the first conductive layer 121 and the second conductive layer 122 upon deformation of the piezoelectric layer 123.

The second conductive layer 122 and the fourth conductive layer 114 may also be embodied as conductive meshes and may comprise an electrically conductive material, in particular a metal such as copper.

Accordingly, the third conductive layer 113 and the fourth conductive layer 114 form an outer mesh structure and the first conductive layer 121 and the second conductive layer 122 form an inner mesh structure.

Figure 1E:
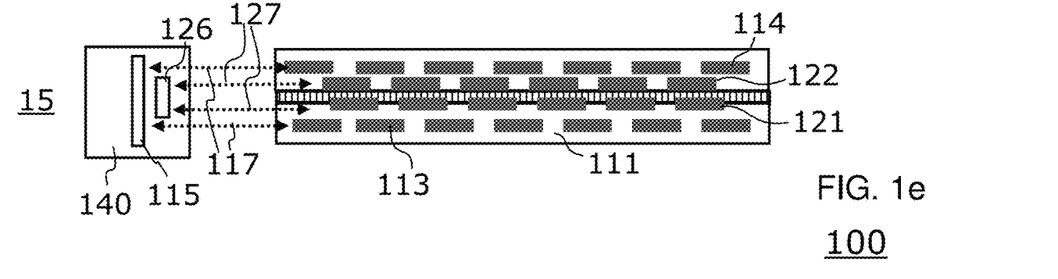

Next, at a step 15, sensing circuitry 126 is provided. The sensing circuitry 126 is electrically coupled to the first conductive layer 121 and the second conductive layer 122 via electrical lines 127 and is configured to observe sensing signals of the piezoelectric layer 123, more particularly a voltage between the first conductive layer 121 and the second conductive layer 122.

According to embodiments, step 15 may also comprise providing sensing circuitry 115 for observing conductance changes of the outer mesh structure 113, 114. The sensing circuitry 115 is electrically coupled to the third conductive layer 113 and the fourth conductive layer 114 via electrical lines 117.

Both the sensing circuitry 126 as well as the sensing circuitry 115 may be integrated in an electronic component 140 that shall be tamper protected by the tamper respondent assembly.

Figure 2A:
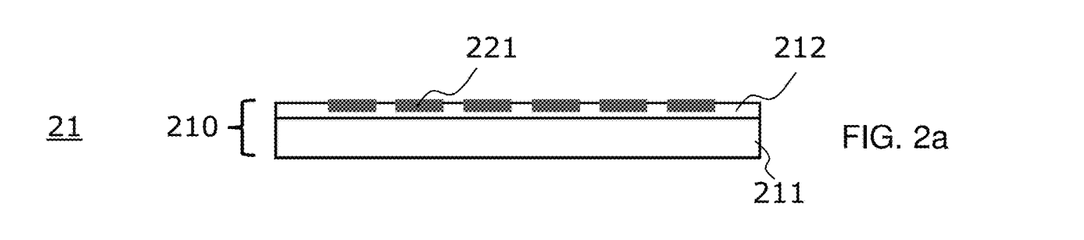
FIGS. 2a, 2b, 2c, 2d and 2e illustrate method steps of a method for fabricating a tamper respondent assembly according to another embodiment of the invention.

FIGS. 2a, 2b, 2c, 2d and 2e illustrate in a schematic and simplified way method steps of a method for fabricating a tamper respondent assembly according to another embodiment of the invention. According to the embodied method, a piezoelectric sensor is integrated in at least a part of the enclosure. Such an integration comprises steps as follows:

At a step 21, a base structure 210 is provided. The base structure 210 comprises a base material 211, which may be in particular a metal. The base material 211 serves as supporting structure to provide mechanical stability. On the base material 211, there is deposited a layer 212, in particular a layer of plastics. According to embodiments, the layer 212 may comprise a plastics material that is suitable for a laser direct structuring process. With such a laser direct structuring process grooves may be formed in the layer 212 that may be subsequently filled with a metal, thereby forming a first conductive layer 221. In embodiments of the invention, the first conductive layer 221 can also be embodied as conductive mesh and includes an electrically conductive material, in particular a metal such as copper.

Figure 2B:
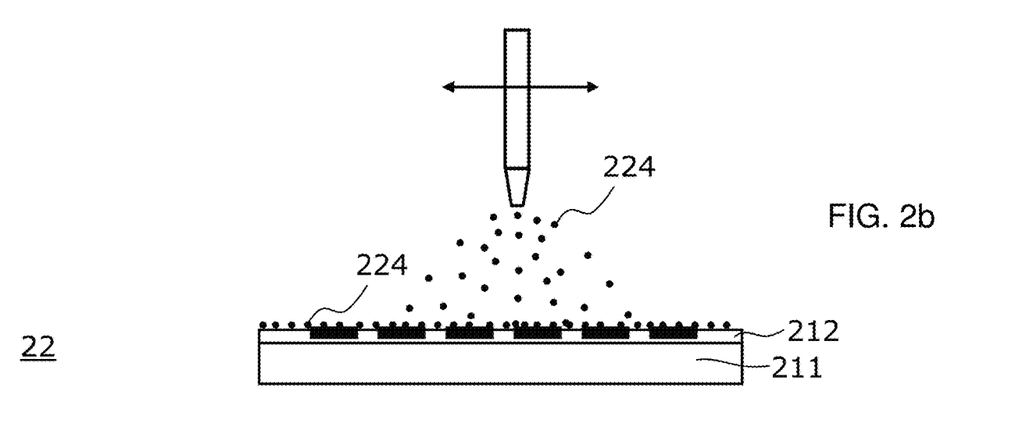
Figure 2C:
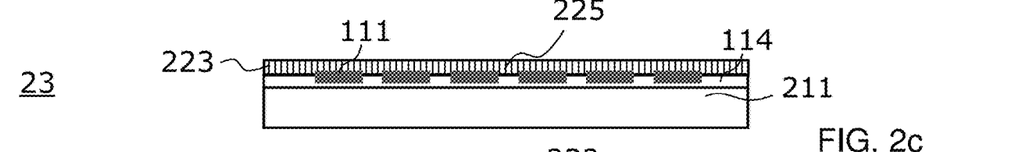

At steps 22 and 23, a piezoelectric layer 223 is deposited on the first conductive layer 221.

The depositing of the piezoelectric layer 223 comprises as step 12 a spraying of a plurality of nanoparticles 224 onto the base structure 210. As a result, the plurality of nanoparticles 224 assemble on the surface of the base structure 210, in particular on the first conductive layer 221. The nanoparticles 224 may be in particular ZnO-nanoparticles.

The depositing of the piezoelectric layer 223 comprises as step 23 a growing of a plurality of nanorods 225 from the plurality of nanoparticles 224 on the base structure 210. As a result, the piezoelectric layer 223 comprises a plurality of nanorods 225. The plurality of nanorods 225 may be grown in particular by a chemical growth process. The chemical growth process may be in particular a low temperature growth process performed at a temperature below 150° C. In embodiments of the invention, the nanorods 225 have an aspect ratio between about 2 and about 50.

According to embodiments, the chemical growth process performed at step 23 involves placing the first structure 210 with the nanoparticles 224 in a solution comprising hexamethylenetetramine.

At the end of step 23, a complete piezoelectric layer 223 comprising a plurality of nanorods 225 has been grown on the first conductive layer 221.

Figure 2D:
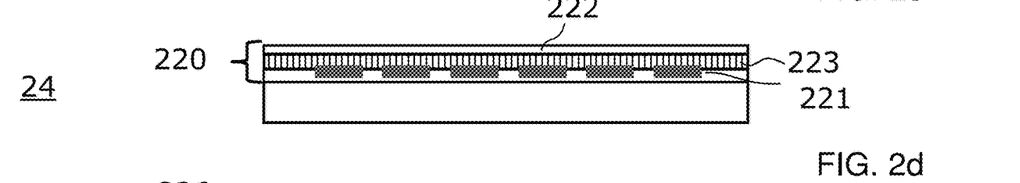

Then at a step 24, a second conductive layer 222 is deposited on the piezoelectric layer 223.

The second conductive layer 222 is embodied as conductive foil 222. The conductive foil 222, which may be e.g. a metal foil, may be attached the piezoelectric layer 223 e.g. by gluing.

As a result, the first conductive layer 221, the second conductive layer 222 and the piezoelectric layer 223 establish a piezoelectric sensor 220.

Figure 2E:
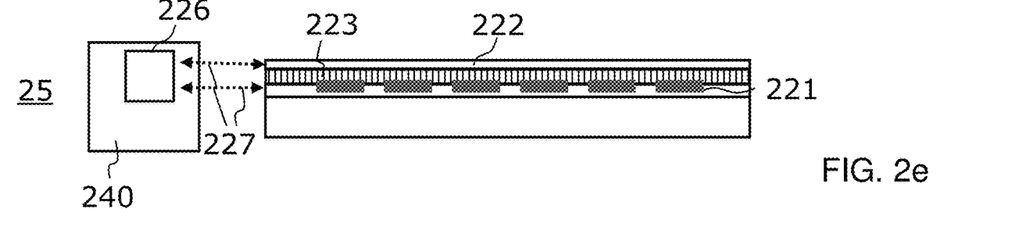

Next, at a step 25, sensing circuitry 226 is provided. The sensing circuitry 226 is electrically coupled to the first conductive layer 221 and the second conductive layer 222 via electrical lines 227 and is configured to observe sensing signals of the piezoelectric layer 223, more particularly a voltage between the first conductive layer 221 and the second conductive layer 222.

The sensing circuitry 226 may be integrated in an electronic component 240 that shall be tamper protected by the tamper respondent assembly.

According to another embodiment which is not explicitly illustrated, the base structure may be formed by liquid crystal polymer molding.

Figure 3A:
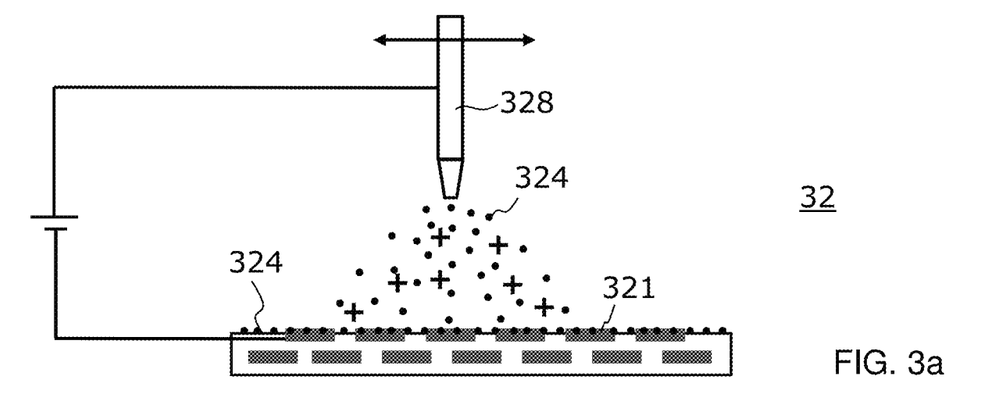
FIG. 3a illustrates an alternative method step for the method steps illustrated in FIGS. 1b and 2b.

FIG. 3a illustrates another embodiment of a method comprising a step 32 that may be used instead of the step 12 of FIG. 1b. The method may comprise as further steps the steps 11, 13, 14 and 15 as illustrated with reference to FIGS. 1a, 1c, 1d and 1e.

At the step 32, a plurality of nanoparticles 324 are electrostatically pre-loaded, in this example with a positive charge. Furthermore, a first conductive layer 321 is coupled to a predefined electrostatic potential, in this example to ground, and a spray gun 328 may be coupled to a positive electrostatic potential for preloading the nanoparticles 324. As a result, an electrostatic force is applied between the nanoparticles 324 and the first conductive layer 321. This facilitates and/or supports an adhesion of the nanoparticles 324 on the first conductive layer 321.

According to another embodiment, step 32 may be used instead of the step 22 of FIG. 2b. Such a method may comprise as further steps the steps 21, 23, 24 and 25 as illustrated with reference to FIGS. 2a, 2c, 2d and 2e.

Figure 3B:
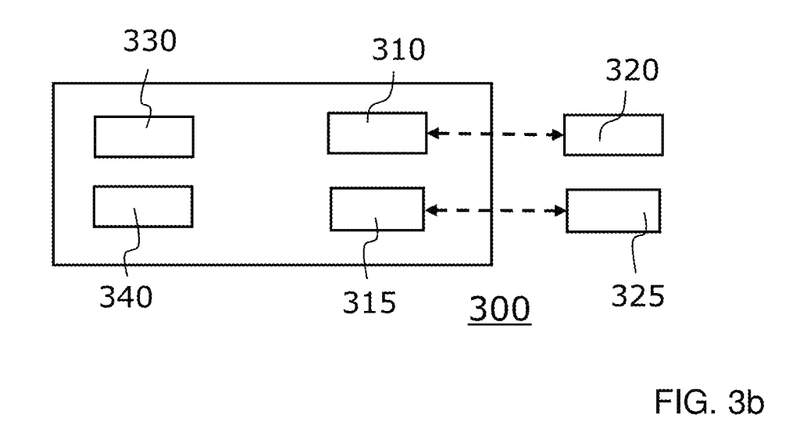
FIG. 3b shows an exemplary block diagram of an electronic component according to an embodiment of the invention.

FIG. 3b shows an exemplary block diagram of an electronic component 300 according to an embodiment of the invention.

The electronic component 300 may be e.g. a microchip, in particular a microchip for processing and/or storing security sensitive information. The electronic component 300 comprises sensing circuitry 310 which may be electrically coupled to a piezoelectric sensor 320. In addition, the electronic component 300 comprises sensing circuitry 315 for observing conductance changes of conductive sensing layers 325.

In addition, the electronic component 300 comprises a memory 330 and a processing unit 340.

The memory 330 may be configured to store security sensitive information, e.g. encryption and decryption keys. The memory unit 330 may be further configured to store a first set of strain profiles associated to non-tampering events and a second set of strain profiles associated to tampering events.

The processing unit 340 may be e.g. configured to process security sensitive information and to perform e.g. encryption and decryption operations.

The processing unit 340 may be further configured to receive an alarm signal from the sensing circuitry 310 and/or the sensing circuitry 315 if a tampering attempt has been detected. Then the processing unit 340 may initiate an action to obstruct analysis of the security-sensitive information, e.g. by erasing the security sensitive information that has been stored in the memory 330.

Figure 4:
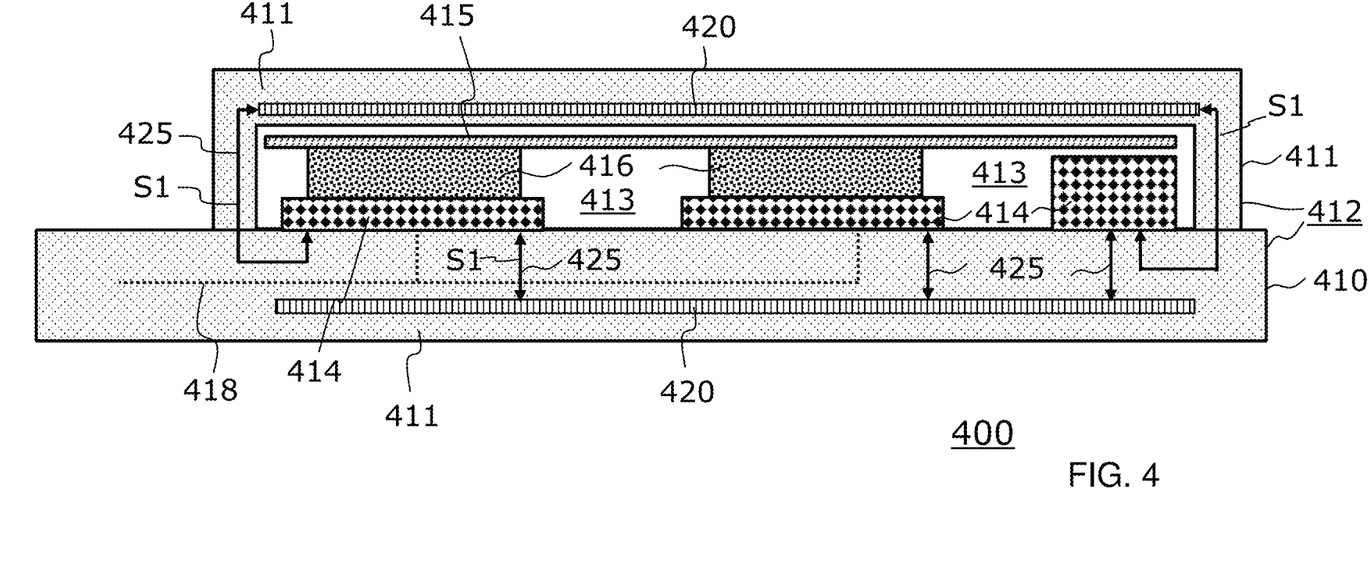
FIG. 4 shows an exemplary cross sectional view of a tamper respondent assembly according to an embodiment of the invention.

FIG. 4 shows an exemplary cross sectional view of a tamper respondent assembly 400 according to an embodiment of the invention. The tamper respondent assembly 400 can be fabricated by the embodied methods described above.

The tamper respondent assembly 400 comprises a printed circuit board 410 and a cover 411 arranged on the printed circuit board 410. The cover 411 and the printed circuit board 410 form an enclosure 412 for a secure volume 413. One or more electronic components 414 are arranged on the printed circuit board 410 and hence within the secure volume 413. The tamper respondent assembly 400 may be in particular a security system for protecting security-sensitive information. The one or more electronic components 414 may be in particular configured to store and/or process security sensitive information. As an example, the electronic components may be e.g. microchips that are configured to perform encryption/decryption operations and may comprise e.g. crypto-cards for this purpose. The security-sensitive information may be e.g. encryption and decryption keys. One or more of the electronic components 414 may be thermally coupled to a heat spreader 415. The coupling between the electronic components 414 and the heat spreader 415 may be improved by thermal coupling elements 416, e.g. by a thermal paste or a thermal compound. The electronic components 414 may communicate with other electronic components of e.g. a server system located outside the secure volume 413 via signal lines 418. The signal lines 418 are illustrated by dotted lines and may be in particular high-speed signal lines. The tamper respondent assembly 400 comprises two piezoelectric sensors 420. One of the piezoelectric sensors 420 is arranged in the cover 411 and another piezoelectric sensor 420 is arranged in the PCB 410. The piezoelectric sensors 420 may be embodied and fabricated as the sensors 120 and 220 as described above with reference to FIGS. 1a to 1e and 2a to 2e respectively. Accordingly each of the piezoelectric sensors 420 comprise a base structure formed by the material of the PCB 410 and the material of the cover 411 respectively. Furthermore, each of the piezoelectric sensors 420 comprise a first conductive layer, a second conductive layer and a piezoelectric layer arranged between the first conductive layer and the second conductive layer. The piezoelectric layer of the piezoelectric sensors each comprise a plurality of nanorods. For ease of illustration, the different components of the piezoelectric sensors 420 are not shown separately in FIG. 4. The electronic components 414 comprise sensing circuitry which observes sensing signals S1 of the piezoelectric sensors 420. For this, the tamper respondent assembly 400 comprises sensing lines 425 which electrically connects the conductive layers of the piezoelectric sensors 420 with the sensing circuitry of the electronic components 414. The sensing lines 425 are embedded within the PCB 410 and the cover 411 respectively. The sensing signals S1 are in particular electrical voltages that are generated by strain applied on the piezoelectric sensors 420, e.g. by tampering events such as drilling. The sensing circuitry of the electronic components 414 is configured to provide an alarm signal upon detection of predefined strain profiles being characteristic for a tampering event.

Figure 5:
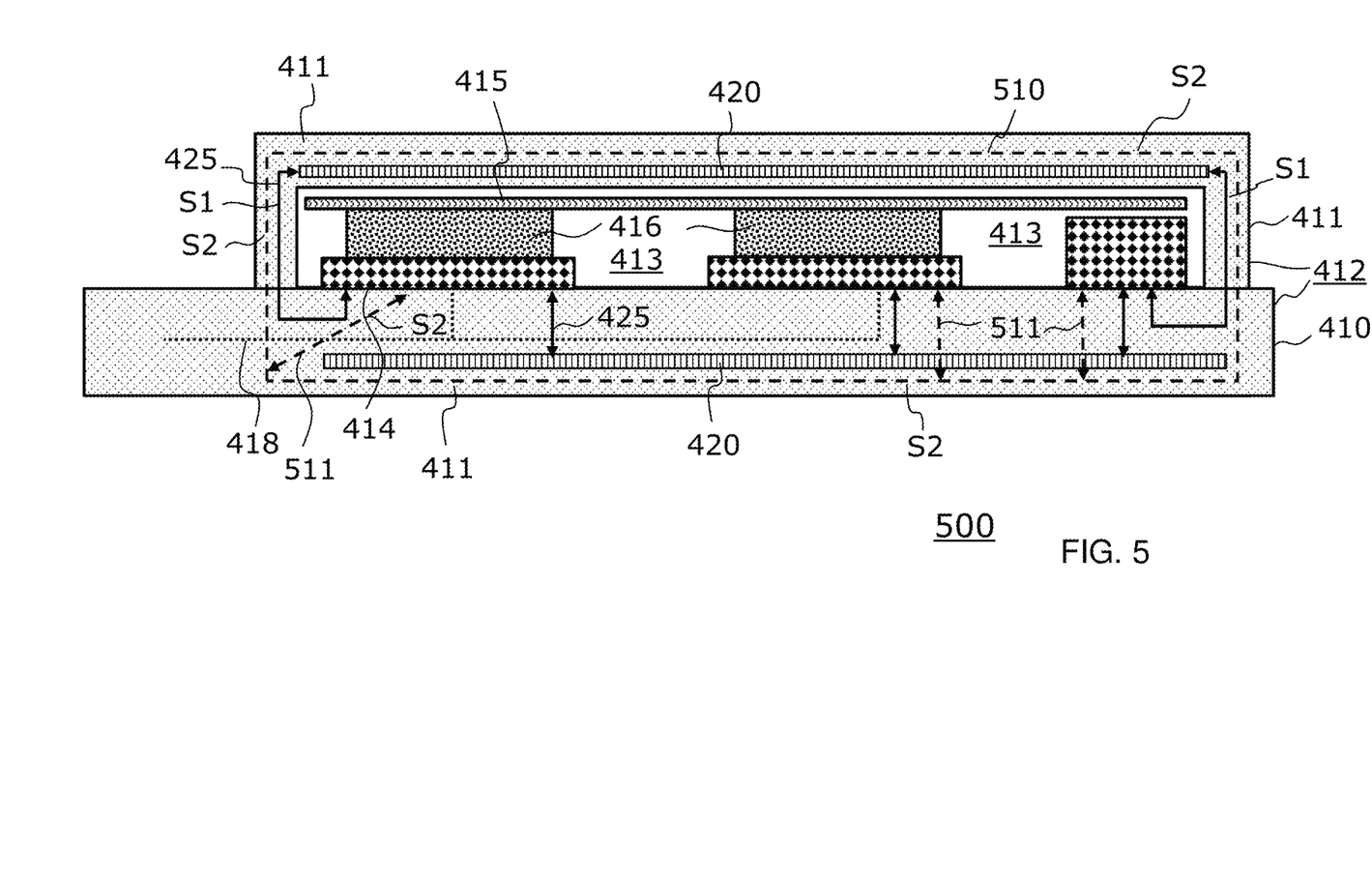
FIG. 5 shows an exemplary cross sectional view of a tamper respondent assembly according to another embodiment of the invention.

FIG. 5 shows an exemplary cross sectional view of a tamper respondent assembly 500 according to another embodiment of the invention. The tamper respondent assembly 500 is to a large extent similar to the tamper respondent assembly 400 as described with reference to FIG. 4. Accordingly, the same reference numerals are used for the same or similar parts.

In addition to the assembly 400, the assembly 500 comprises an additional conductive mesh structure 510 that is arranged in the PCB 410 as well as in the cover 411 of the enclosure 412. Accordingly, the conductive mesh structure 510 encloses the piezoelectric sensors 420 as well as the secure volume 413. The conductive mesh structure 510 is electrically coupled via sensing lines 511 to the electronic components 420 and provides sensing signals S2 to the electronic components 420. According to the embodiment of FIG. 5, the electronic components 420 comprise also a sensing circuitry that observes the sensing signals S2 and detects resistance changes of the conductive mesh structure 510 due to tampering events. This provides enhanced security.

Figure 6:
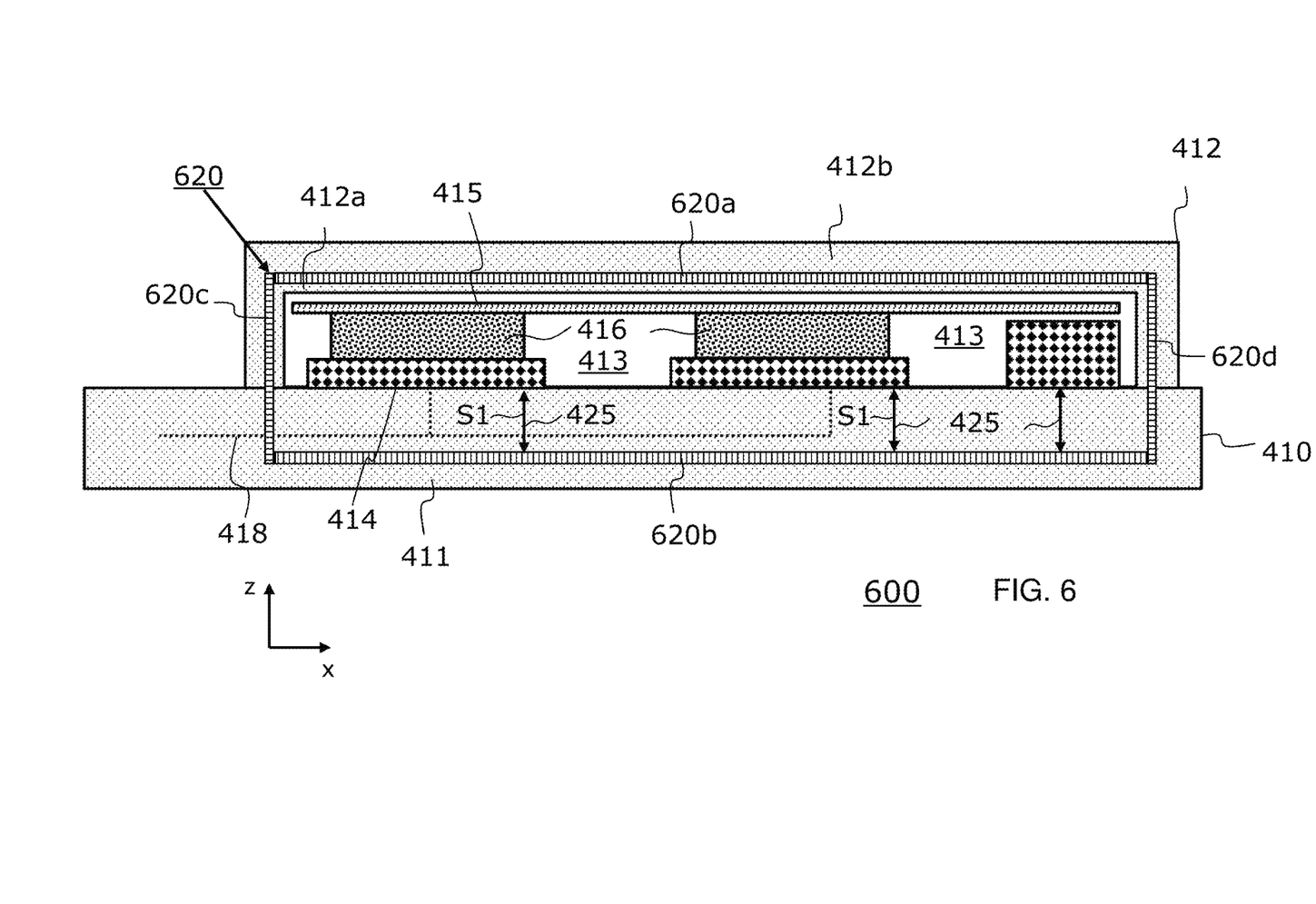
FIG. 6 shows an exemplary cross sectional view of a tamper respondent assembly according to another embodiment of the invention.

FIG. 6 shows an exemplary cross sectional view of a tamper respondent assembly 600 according to another embodiment of the invention. The tamper respondent assembly 600 is to a large extent similar to the tamper respondent assembly as described with reference top FIG. 4. Accordingly, the same reference numerals are used for the same or similar parts.

In contrast to the tamper respondent assembly 400, the tamper respondent assembly 600 comprises a piezoelectric sensor 620 that fully encloses the secure volume 413. In other words, the piezoelectric sensor 620 forms a complete piezoelectric shield around the secure volume 413 and hence also extends in a vertical z-direction along side-portions of the secure volume 413. More particularly, the piezoelectric sensor 620 comprises a top part 620a, a bottom part 620b and two side parts 620c and 620d. This provides enhanced security of the secure volume 413. Such an embodiment is facilitated by the advanced fabrication methods according to embodiments of the invention.

In terms of fabrication steps, the tamper respondent assembly of FIG. 6 may be fabricated e.g. as follows:

At first, a part of the PCB 410 is 3D-printed as base structure including the first conductive layer. Then the bottom part 620b of the piezoelectric sensor 620 is formed by the spraying of nanoparticles and the growing of nanorods as described e.g. with reference to FIGS. 1b and 1c and by forming the second conductive layer of the bottom part 620b, e.g. by 3D-printing. Next the printing of the PCB 410 is continued, including the printing of electrical connections to the electronic components 414. Then the electronic components 414 are arranged on the PCB 410, e.g. by soldering. After that an inner part 412a of the cover 412 is printed by 3D-printing including printing first conductive layers of the side parts 620c and 620d as well as of the top part 620a of the piezoelectric sensor 620. Then the side parts 620c and 620d as well as the top part 620a of the piezoelectric sensor 620 are further formed by spraying nanoparticles and growing nanorods. In embodiments of the invention, this can be done in two sub-steps, wherein the assembly 600 is rotated to provide a horizontal surface for the respective spraying process. Next the second conductive layers of the side parts 620c and 620d as well as of the top part 620a of the piezoelectric sensor 620 is applied, e.g. again by 3D-printing. Finally, an outer part 412b of the cover 412 is formed, e.g. by 3D-printing.

Figure 7:
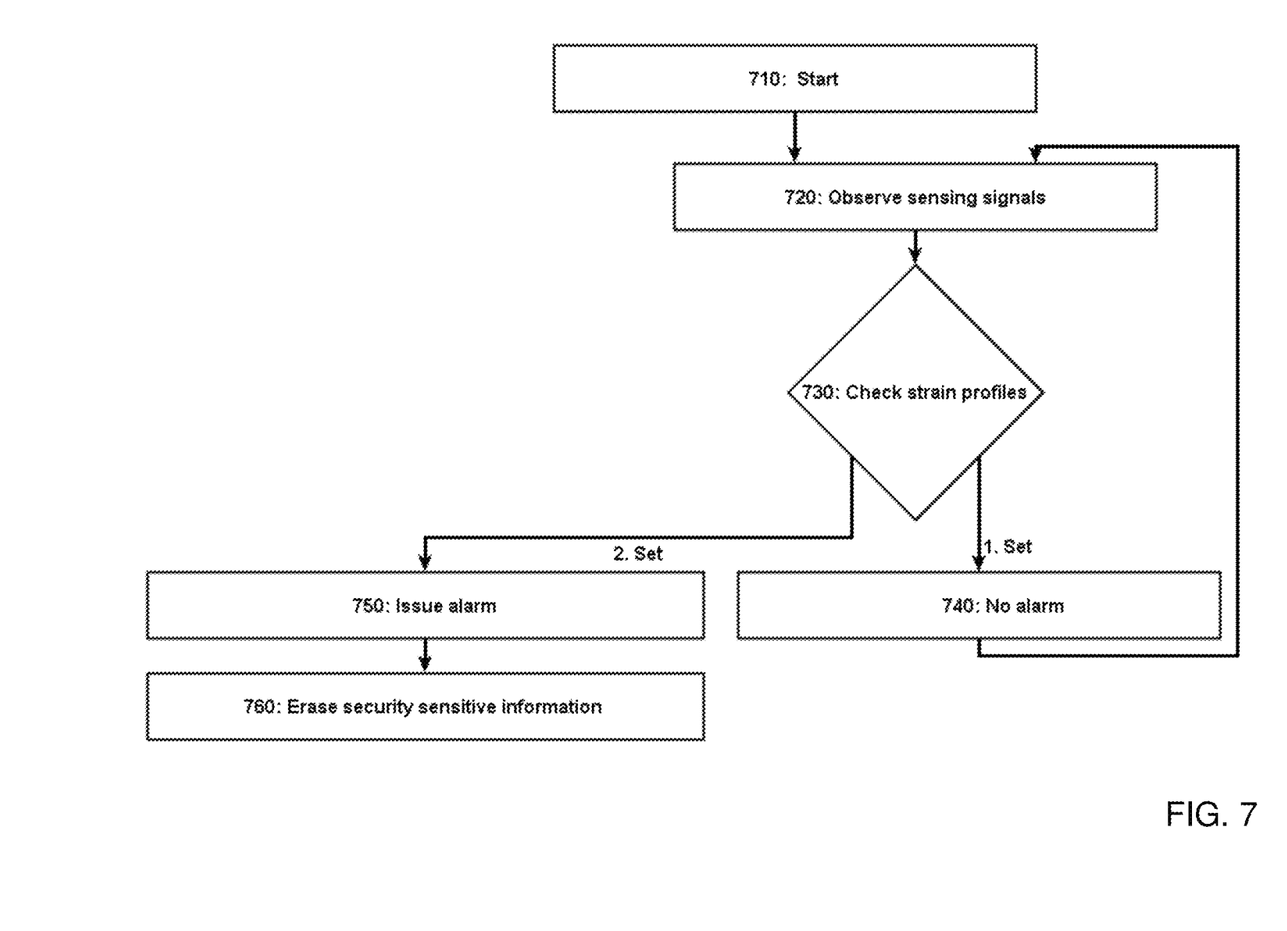
FIG. 7 shows a flow chart of method steps of a method for observing sensing signals of sensing circuitry of a security system according to an embodiment of the invention.

FIG. 7 illustrates steps of a method for observing sensing signals of sensing circuitry of a security system according to an embodiment of the invention. The method may be performed e.g. by a computer program product running on one or more of the electronic components, e.g. the electronic components 300 of FIG. 3 and the electronic components 414 of FIGS. 4 to 6. The computer program product may be stored e.g. in the memory 330 of the electronic component 300.

At a step 710, the method is started.

At a step 720, the sensing circuitry starts to observe the sensing signals of the piezoelectric sensor.

At a step 730, the sensing circuitry checks and compares strain profiles of the sensing signals with predefined strain profiles.

If the detected strain profile corresponds to a first set of strain profiles associated to non-tampering events, the sensing circuitry refrains from issuing an alarm signal at a step 740 and continues to observe the sensing signals.

If the detected strain profile corresponds to a second set of strain profiles associated to tampering events, the sensing circuitry provides/issues at a step 750 an alarm signal.

Then the electronic component initiates at a step 760 an action to obstruct analysis of the security-sensitive information, e.g. by erasing the security sensitive information.

The terms "about," "substantially," "approximately," "slightly less than," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product. The computer program product may include a computer readable storage medium (or media) having computer readable program instructions thereon for causing a processor/processing unit, e.g. the processing unit 340 of the electronic component 300, to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to fabricate a tamper respondent assembly, the tamper respondent assembly comprising an electronic component and an enclosure at least partly enclosing the electronic component, the method comprising integrating a piezoelectric sensor in the enclosure, the integrating comprising providing a base structure comprising a first conductive layer, a first insulating layer deposited over the first conductive layer, and a second conductive layer deposited over the first insulating layer, the second conductive layer comprising a metal;

depositing a piezoelectric layer on the second conductive layer, the piezoelectric layer comprising a plurality of nanorods;

covering the piezoelectric layer with a second structure comprising a third conductive layer, a second insulating layer deposited over the third conductive layer, and a fourth conductive layer deposited over the second insulating layer; and providing sensing circuitry for observing sensing signals of the piezoelectric layer, wherein an electrode of the sensing circuitry comprises the second conductive layer.

2. A method according to claim 1, wherein the depositing of the piezoelectric layer comprises:
spraying a plurality of nanoparticles onto the first structure; and
growing the plurality of nanorods on the first structure.

3. A method according to claim 2, wherein growing the plurality of nanorods comprises a chemical growth process.

4. A method according to claim 3, wherein the chemical growth process comprises a low temperature growth process performed at a temperature below about 150° C.

5. A method according to claim 3, wherein the chemical growth process involves placing the first structure with the nanoparticles in a solution comprising hexamethylenetetramine.

6. A method according to claim 1, wherein the nanoparticles are selected from a group consisting of zinc oxide, lead zirconate titanate and barium titanate.

7. A method according to claim 2, wherein the plurality of nanoparticles are electrostatically pre-loaded to facilitate an adhesion of the nanoparticles on the first conductive layer.

8. A method according to claim 2, wherein the first conductive layer is coupled to a predefined electrostatic potential to facilitate an adhesion of the nanoparticles on the first conductive layer.

9. A method according to claim 2, wherein spraying the nanoparticles comprises spraying a solution comprising the nanoparticles and a solvent.

10. A method according to claim 1, wherein the nanorods have an aspect ratio between about 2 and about 50.

11. A method according to claim 1, wherein the first conductive layer comprises a conductive mesh.

12. A method according to claim 1, wherein the second conductive layer comprises a conductive mesh.

13. A method according to claim 1, wherein the second conductive layer comprises a conductive foil.

14. A method according to claim 1, wherein
providing the base structure comprises printing the base structure by a 3-dimensional printing process; and
covering the piezoelectric layer with the second conductive layer comprises printing the second conductive layer by a 3-dimensional printing process.

15. A method according to claim 1, wherein
providing the base structure comprises forming the base structure by laser direct structuring; and
covering the piezoelectric layer with a second conductive layer comprises attaching a metal foil on the piezoelectric layer.

16. A method according to claim 1, wherein
providing the base structure comprises forming the base structure by liquid crystal polymer molding.

17. A tamper respondent assembly comprising:
an electronic component;
an enclosure enclosing at least partly the electronic component; and
a piezoelectric sensor integrated in the enclosure;
wherein the piezoelectric sensor comprises:
a base structure comprising a first conductive layer, a first insulating layer deposited over the first conductive layer, and a second conductive layer deposited over the first insulating layer, the second conductive layer comprising a metal;
a piezoelectric layer deposited on the base structure and arranged between the base structure and a second structure comprising a third conductive layer, a second insulating layer deposited over the third conductive layer, and a fourth conductive layer deposited over the second insulating layer, wherein the piezoelectric layer comprises a plurality of nanorods; and
sensing circuitry configured to observe sensing signals of the integrated piezoelectric sensor, wherein an electrode of the sensing circuitry comprises the second conductive layer.

18. A tamper respondent assembly according to claim 17, wherein the sensing circuitry is configured with a plurality of strain profiles, the plurality of strain profiles comprising a first set of strain profiles associated to non-tampering events and a second set of strain profiles associated to tampering events.

19. A tamper respondent assembly according to claim 17, wherein at least the first conductive layer comprises a mesh structure.

20. A tamper respondent assembly according to claim 17, wherein the enclosure comprises:
an outer mesh structure comprising a third conductive layer and a fourth conductive layer; and
a sensing circuitry configured to observe conductance changes of the outer mesh structure;
wherein the piezoelectric sensor is arranged between the third conductive layer and the fourth conductive layer.

21. A tamper respondent assembly according to claim 17, wherein the nanoparticles are selected from a group consisting of zinc oxide, lead zirconate titanate and barium titanate.

22. A tamper respondent assembly according to claim 17 further comprising
a printed circuit board; and
a cover arranged on the printed circuit board;
wherein the electronic component is arranged on the printed circuit board;
wherein the cover and the printed circuit board form the enclosure;
wherein the piezoelectric sensor is integrated in the printed circuit board.

23. A tamper respondent assembly according to claim 17 further comprising
a printed circuit board; and
a cover arranged on the printed circuit board;
wherein the electronic component is arranged on the printed circuit board;
wherein the cover and the printed circuit board form the enclosure;
wherein the piezoelectric sensor is integrated in the cover.

24. A security system for protecting security-sensitive information, the security system comprising:
an electronic component configured to store and/or process security sensitive information; and
a piezoelectric sensor comprising:
a base structure comprising a first conductive layer, a first insulating layer deposited over the first conductive layer, and a second conductive layer deposited over the first insulating layer, the second conductive layer comprising a metal;
a piezoelectric layer deposited on the base structure and arranged between the base structure and a second structure comprising a third conductive layer, a second insulating layer deposited over the third conductive layer, and a fourth conductive layer deposited over the second insulating layer, wherein the piezoelectric layer comprises a plurality of nanorods;

sensing circuitry configured to observe sensing signals of the piezoelectric sensor, wherein an electrode of the sensing circuitry comprises the second conductive layer; and provide an alarm signal to the electronic component upon detection of predefined strain profiles;

wherein the electronic component is configured to initiate an action to obstruct analysis of the security-sensitive information upon receipt of the alarm signal.

25. A computer program product for observing sensing signals of sensing circuitry of a security system for protecting security-sensitive information, the security system comprising an electronic component configured to store and/or process security sensitive information;

a piezoelectric sensor comprising:

a base structure comprising a first conductive layer, a first insulating layer deposited over the first conductive layer, and a second conductive layer deposited over the first insulating layer, the second conductive layer comprising a metal; and a piezoelectric layer deposited on the base structure and arranged between the base structure and a second structure comprising a third conductive layer, a second insulating layer deposited over the third conductive layer, and a fourth conductive layer deposited over the second insulating layer, wherein the piezoelectric layer comprises a plurality of nanorods; and sensing circuitry for observing sensing signals of the piezoelectric sensor, wherein an electrode of the sensing circuitry comprises the second conductive layer;

the computer program product comprising a computer readable storage medium having program instructions embodied therewith, the program instructions executable by the security system to cause the security system to perform a method comprising:

observing sensing signals of the piezoelectric sensor;

providing an alarm signal upon detection of predefined strain profiles; and initiating an action to obstruct analysis of the security-sensitive information upon receipt of the alarm signal.

* * * * *